(12) United States Patent
Princigallo et al.

(10) Patent No.: US 10,239,785 B2
(45) Date of Patent: Mar. 26, 2019

(54) ACTIVATED PULVERISED GLASS AS AN ADDITIVE FOR MORTARS AND CEMENT, AND RELATED CEMENTITIOUS PRODUCTS

(71) Applicant: ITALCEMENTI S.P.A., Bergamo (IT)

(72) Inventors: Antonio Princigallo, Stezzano (IT); Stefano Cangiano, Torre de Roveri (IT)

(73) Assignee: ITALCEMENTI S.P.A., Bergamo (IT)

( * ) Notice: Subject to any disclaimer, the term of this patent is extended or adjusted under 35 U.S.C. 154(b) by 104 days.

(21) Appl. No.: 14/366,520

(22) PCT Filed: Dec. 20, 2012

(86) PCT No.: PCT/EP2012/076323
§ 371 (c)(1),
(2) Date: Jun. 18, 2014

(87) PCT Pub. No.: WO2013/092826
PCT Pub. Date: Jun. 27, 2013

(65) Prior Publication Data
US 2015/0122156 A1    May 7, 2015

(30) Foreign Application Priority Data

Dec. 20, 2011    (IT) .............................. MI2011A2326

(51) Int. Cl.
| | | |
|---|---|---|
| C04B 14/00 | (2006.01) |
| C04B 14/22 | (2006.01) |
| C04B 28/02 | (2006.01) |
| C03C 23/00 | (2006.01) |
| B02C 23/10 | (2006.01) |

(Continued)

(52) U.S. Cl.
CPC .............. C04B 14/22 (2013.01); B02C 23/10 (2013.01); B02C 23/20 (2013.01); C03C 23/0075 (2013.01); C04B 28/02 (2013.01); *C04B 2111/2023* (2013.01)

(58) Field of Classification Search
CPC .................................. C04B 14/22; C03C 3/00
See application file for complete search history.

(56) References Cited

U.S. PATENT DOCUMENTS 5,340,776 A * 8/1994 Paschke et al. ................ 501/11
5,950,936 A    9/1999 Bergart
(Continued)

FOREIGN PATENT DOCUMENTS

WO    94/19294    9/1994

OTHER PUBLICATIONS

S. Kozlova et al., A suggested screening test for ASR in cement-bound composites containing glass aggregate based on autoclaving; Cement and Concrete Composites, vol. 26, No. 7, Oct. 1, 2004.
(Continued)

*Primary Examiner* — James E McDonough
(74) *Attorney, Agent, or Firm* — Abelman, Frayne & Schwab (57) ABSTRACT

The present invention relates to a cementitious composition adapted to form mortars or cements comprising glass as an additive having reduced tendency to reaction with alkali, characterized in that said glass is obtained by grinding and subsequent washing with water.

6 Claims, 4 Drawing Sheets

(51) Int. Cl.
    *B02C 23/20*     (2006.01)
    *C04B 7/00*     (2006.01)
    *C04B 7/34*     (2006.01)
    *C04B 28/00*     (2006.01)
    *C04B 32/00*     (2006.01)
    *C04B 111/20*     (2006.01)

(56) References Cited

U.S. PATENT DOCUMENTS

| | | | | |
|---|---|---|---|---|
| 6,743,287 | B2 * | 6/2004 | Sunde | C04B 14/062 |
| | | | | 106/697 |
| 6,866,929 | B2 * | 3/2005 | Kodas et al. | 428/357 |
| 7,413,602 | B2 * | 8/2008 | Grasso, Jr. | C04B 14/22 |
| | | | | 106/716 |
| 7,700,017 | B2 * | 4/2010 | McCarthy | C04B 28/02 |
| | | | | 264/333 |
| 2008/0308659 | A1 * | 12/2008 | Grasso, Jr. | C04B 14/22 |
| | | | | 241/23 |
| 2009/0272298 | A1 * | 11/2009 | Petersen | C04B 14/22 |
| | | | | 106/716 |
| 2009/0283018 | A1 * | 11/2009 | Grasso, Jr. | B02C 17/22 |
| | | | | 106/709 |
| 2011/0172075 | A1 * | 7/2011 | Grasso, Jr. | B02C 17/22 |
| | | | | 501/11 |

OTHER PUBLICATIONS

Ahmad Shayan et al., Value-added utilisation of waste glass in concrete; Cement and Concrete Research, vol. 34, No. 1, Jan. 1, 2004.

Yixin Shao et al., Studies on concrete containing ground waste glass; Cement and Concrete Research, vol. 30, No. 1, Jan. 1, 2000.

International Search Report and Written Opinion dated Mar. 6, 2013 for corresponding international patent application No. PCT/EP2012/076323.

* cited by examiner

ACTIVATED PULVERISED GLASS AS AN ADDITIVE FOR MORTARS AND CEMENT, AND RELATED CEMENTITIOUS PRODUCTS

CROSS REFERENCE TO RELATED APPLICATIONS

This application is a national phase of PCT application No. PCT/EP2012/076323, filed Dec. 20, 2012, which claims priority to IT patent application No. MI2011A002326, filed Dec. 20, 2011, all of which are incorporated herein by reference thereto.

FIELD OF THE INVENTION

The present invention relates to additives for mortar and cement, comprising activated ground glass, having latent hydraulic activity, and related cementitious compositions.

PRIOR ART

Glasses are silica-based materials having a high content of activated silica and appreciable contents of sodium and calcium. The materials referred to are obtained by solidification from the liquid phase without concomitant crystallisation and are therefore assimilable into liquids of extremely elevated viscosity. Being non-crystalline, the structure of glass must be considered unstable and thus susceptible to alkaline attack, especially when the silica matrix is rendered readily available, for example by means of compression comminution of glass. Such is the case, for example, of powdered glass obtained by grinding to low granulometry in glass-fragment recycling processes.

Whilst the use of glass is not admitted as a principal constituent of cements in the European standard EN 197-1, glasses can be used in cement as a recycled mineral additive in accordance with the European standard EN 12620 by limiting its content to 2% of the total aggregates used in the cement. For ordinary cements, this value corresponds to a content of approximately 30-40 kg of glass per cubic meter of cement.

Mineral additive is used to mean any type of finely subdivided inorganic material that can be added to cement to impart improved charactersitics of mechanical resistance and durability. The additives may be inert, pozzolanic, or with latent hydraulic activity, as laid down in the European standard EN 206-1.

One of the problems posed by the use of glass in cement resides in the risk of the potential onset of expansion phenomena in the already hardened cement if certain conditions occur.

The principal one is the potential release of alkali into the cementitious matrix. Such release could lead to a limited life of structures made of cement, because of the occurrence of degradation phenomena resulting from the "alkali-aggregate reaction" (AAR). The AAR is a degradation phenomenon associated with a chemical reaction between a few forms of reactive silica contained in a few types of aggregate and the cementitious matrix.

It is generally accepted that the alkali-aggregate reaction can take place when the following series of conditions are present simultaneously:
  i. Presence of sufficient moisture in the cement (permanently or temporarily)
  ii. Presence in the aggregates of a sufficient content of species reactive to the alkali (principally reactive silica)
  iii. Presence of a sufficient percentage of alkalis in the cementitious paste placed in contact with the aggregates.

The AAR phenomenon is in general difficult to control, because the physico-chemical mechanisms which regulate its evolution are of very slow kinetics. The negative effect on structures are in evidence even many years after their erection, through the development of a network of cracks in the cement. Consequently, the mechanical characteristics of the cement may be broken down and/or the functionality of its the structure may be lost.

The action mechanism of the AAR comprises an initial phase of increasing alkalinity of the solution following dissolution deriving from various sources of sodium, potassium and calcium ions. In a subsequent phase, the Si—O bonds in the silica exposed at the surface of the aggregate are hydrated to form a gel containing $H_2SiO_4^{2-}$, $H_3SiO_4^{-}$ ions and cations such as $K^+$, $Na^+$, $Ca^{2+}$ in variable proportion.

This gel covering the surface of the aggregate exposed to attack tends to absorb molecules of water and to expand, locally generating traction forces in the cementitious matrix, which may fracture if adequate traction resistance does not develop.

More particularly, the hydroxyl ions generated by hydration of the alkalis functions to trigger the chemical reaction, for which the setting of an elevated pH may in general be considered a condition favourable to the reaction itself.

The occurrence of AAR may give rise to undesirable phenomena within structures, such as:
  widespread cracking
  discolouration around the cracks
  exudation of gel from the cracks
  disalignment of adjacent sections
  joint closure
  localised explosion phenomena To limit the occurrence of the AAR phenomenon, intervention is aimed at the mechanisms underlying the phenomenon, by trying to exclude at least one of the conditions (i, ii, iii) mentioned above. More particularly, since point (i) is strongly dependent on the conditions of exposure of the manufactured article, and point (ii) is innate to the aggregates, it is often difficult or non-practicable to modify its effects. With regard to point (iii), a few possible strategies for reducing the risk of occurrence of the AAR are:
  I. use of constituents for cement having a limited alkali content
  II. use of materials having latent hydraulic or pozzolanic activity in admixture with the cement (pozzolan, fly ash, slag, microsilica, metakaolin, etc.).

In particular the action of materials having latent hydraulic or pozzolanic activity to mitigate the AAR is favoured by the elevated grinding fineness of the actual constituents and by the possibility of obtaining a homogenous distribution thereof in the cement mixture.

More specifically, the action of materials with pozzolanic activity on the action mechanism of the AAR is explained in the sense of obtaining a greater volume of hydration products, the latter being capable of fixing, in the microstructure of the hardened mixture, the alkalis available in the fluid phase by avoiding their migration towards the surface of the aggregates with the consequent possibility of activating, in a localised manner, the adverse reaction.

At the same time, another positive effect associated with the use of pozzolanic materials resides in the consequent lowering of the pH of the cementitious matrix, with consequent inhibition of the AAR action mechanism.

In the case of use of materials having elevated contents of activated silica, it can be hypothesised that the very existence of a distributed system of potentially reactive particles according to the AAR may in some measure limit a localised attack at the surface of the aggregate itself. In this case, the compression comminution of the AAR reactive phase may allow this diminution in a sense disfavourable to the proportion of the surface of the AAR-attackable aggregates exposed to the liquid phase, where this surface is compared with the overall attackable surface developed by agagregate and finely subdivided pozzolanic additive.

The effectiveness of the use of ground glass as a mitigator of AAR is attributable to the possibility that the negative contribution to the reaction mechanism deriving from the supply of alkalis released to the cementitious matrix by the glass is compensated for and exceeded by the positive contribution deriving from the possibility of implementing a system of eminently siliceous particles having pozzolanic activity, the ultimate function of which is to distribute the AAR attack, avoiding its localisation at the surface between the aggregate and the cementitious matrix itself.

A case of the use of large glass particles having dimensions up to 10 mm and derived from recycling processes is described in U.S. Pat. No. 7,700,017 B2 wherein, for the purposes of limiting the risk of occurrence of AAR in cement deriving from the use of a glass of low fineness, an AAR-inhibiting agent, i.e. metakaolin, is used contextually in a proportion relevant to the glass.

On the other hand, an expansive action associated with the presence of Pyrex glass in greater than 150 micron fineness is known in the literature, the use being reported of Pyrex glass as a reactive aggregate in place of sand in the mixture in mortar as a reference material when conducting tests to evaluate the reactivity of alkalis of the cementitious-based mixtures. For the same reason, Pyrex glass is used in a fineness greater than 150 micron and up to 4.75 mm as a reactive aggregate in the standard ASTM C 441-05 to verify the efficacy of pozzolan for preventing excessive expansions in cement caused by AAR.

In general, the use of glass in cement is considered prejudicial in terms of AAR, although an opposite effect on the expansion of mortars has occasionally been reported. Shao et al. (Cement and Concrete Research 30 (2000) 91-100) have demonstrated that a ground glass derived from recycling by grinding up fluorescent light bulbs having the following composition:
$SiO_2$=72.8%
$Al_2O_3$=1.4%
CaO=4.9%
$Na_2O$=16.3%
and having a fineness less than 38 micron, has led to a marked reduction in the expansions tested in mortar when used in partial substitution for cement. The same glass of fineness between 38 and 75 micron demonstrated no substantial effects of expansion reduction as compared with the reference.

A reduction in the expansions associated with the use of glass refined to a fineness below 71 micron (expressed as passing at the 90% confidence limit) is reported B. M. Pedersen (Norwegian University of Science and Technology (2004), "Alkali-reactive and inert fillers in concrete") using a glass having the following composition:
$SiO_2$=70.8%
$Al_2O_3$=2.54%
CaO=10.55%
$Na_2O$=11.29%.

In WO 2011/038722, to limit the release of alkalis from vitreous aggregates, a coloured adhesive coating for the aggregate is proposed.

SUMMARY OF THE INVENTION

According to the present invention, a cementitious composition for forming mortars or cement is proposed, comprising glass as a mineral additive having reduced tendency to reaction with alkalis, characterised in that said in glass is obtained by grinding and subsequent washing with water.

More generally, and independently of the time of addition to a cementitious mixture, the present invention relates to the use of glass as an additive having reduced tendency to reaction with alkalis, in a cementitious mixture adapted to form mortars or cements, characterised in that said glass is obtained by grinding and subsequent washing with water.

Surprisingly, according to the present invention it has in fact been found that the efficacy of the use of ground glass as a mitigator of the alkali-aggregate reaction (AAR) is increased when the glass, ground to pulverisation, i.e. to a mean diameter between 10 and 200 microns, is then subjected to washing with water, preferably conducted using a series of successive washings.

This washing with water constitutes, according to the invention, a process of activation according to which:
a) the activated pulverised glass acquires a higher content of reactive silica and therefore a pozzolanic activity greater than that of non-activated glass
b) the activated pulverised glass has a modified fineness as compared with non-activated glass. More particularly, the granulometric distribution of activated pulverised glass tends to monogranularity more than an inactivated pulverised glass. Furthermore, particle disagglomeration phenomena can lead to a lower mean granule dimension, thus improving the capacity to mitigation of AAR.
c) activated pulverised glass has a lower density than pulverised glass.
d) activated pulverised glass has a larger BET specific surface area than non-activated glass. It can be hypothesised that, following washing, the particles of glass are subjected to a superficial release of alkalis accompanied by an increase in surface irregularities on the scale of length of the nanometric order demonstrable by BET analysis.

Non-activated pulverised glass, which is therefore outside the present invention, may equally have an elevated BET specific surface area by reason of the forced grinding fineness, characterisable, for example, by means of laser granulometric analysis. The BET parameter is therefore insufficient to identify a glass according to the present invention. In this regard, a nullifying parameter has been identified as follows:
1. the BET specific surface, $SS_{BET}$ expressed in $m^2/g$, is a quantity which, determined by absorption of nitrogen on the surface of the glass, measures surface per unit of mass of the sample and is sensitive to changes in surface roughness of the particles down to a scale of length of the nanometric order. The operating principle of the method is based on determination of a quantity of nitrogen adsorbed on to the surface of the sample, therefore the shape of the particles is not relevant.
2. the laser specific surface Sv, expressed in $m^2/cm^3$, determined by laser diffractometry, measures the surface area per unit of volume of the sample and is sensitive to variations in the granulometric distribution of the sample. The operating principle of the method is based on the interaction of the constituent particles of the sample with a laser source of predetermined wavelength, incident upon the sample. The diffraction phenomenon determines a deviation of the light beam from its original course, the magnitude of which increases by the same amount as the decrease in particle size. Thus, in the case of a monodisperse sample, the sensitivity of this measurement method is directly related to determination of the characteristic size of the particle, here said equivalent particle diameter, in the approximation of considering the particles to be spherical.

3. in the more general case of a non-monodisperse sample, the granulometric distribution of the particles is usually described by the parameters xp and n of the Rosin-Rammler distribution, hereinafter given as percentage passing, P function of the particle dimension, x:

$$P(x) = 1 - e^{-\left(\frac{x}{xp}\right)^n}$$

P(x) describes the sample fraction, the distribution curve of which is characterised by a mean diameter xp and an amplitude n, with an equivalent diameter lower than x.

4. the specific laser surface Sv can be calculated indirectly on the basis of the performed determinations of particle size, by totaling the contribution to the overall surface of each individual granulometric fraction constituting the sample, as described by the Rosin-Rammler distribution, in a hypothesis of spherical shape of the particles.

5. Since they are expressed in unlike units of measurement, $m^2/g$ and $m^2/cm^3$ respectively, the BET specific surface, $SS_{BET}$, and the specific laser surface, Sv are not directly comparable. For this purpose, it is necessary to use, as the multiplying factor, the density value expressed in $g/cm^3$ determined with a helium pycnometer.

Based on these considerations, according to the present invention an activation parameter A has been defined with which to identify unequivocally the geometric and morphological changes produced by the activation process, A being the ratio between the BET specific surface, expressed in $m^2/g$, and the laser specific surface Sv, expressed in $m^2/cm^3$, multiplied by the density, ρ, expressed in $g/cm^3$, specified as follows:

$$A = SS_{BET} [m^2/g]/Sv [m^2/cm^3] \cdot \rho [g/cm^3]$$

This parameter, which is dimensionless, corresponds to the ratio between the porous surface of the glass sample, which surface is generated by the activation process according to the present invention, and surface area per unit volume of sample prior to the activation process. Since both these surfaces have a potential AAR-withstanding effect, the said parameter A allows an activated pulverised glass according to the present invention to be distinguished from a pulverised glass outside the scope of the present invention, for all that the latter can exhibit AAR phenomenon-reducing activity on account of its elevated fineness deriving solely from the compression comminution process.

According to the present invention, the parameter A of an activated pulverised glass must be within the range from 1.9 to 4.0; and preferably from 2.0 to 3.0.

In the present description, by cementitious compositions is meant cementitious mixtures comprising at least one hydraulic binder, water and, if necessary:

one or more aggregates, and/or one or more mineral additives, and/or fibres for cement, and/or one or more conventional additives.

By the term hydraulic binder is meant a material in powder form, in the dry state, which when it is mixed with water yields plastic mixtures capable of solidifying and hardening. By cements is meant, in particular, those included in the European standard EN 197-1.

Cementitious compositions are divided up into pastes (compositions devoid of inert aggregates) and conglomerates (compositions containing at least one inert aggregate). Conglomerates are in turn divided up into mortars (containing fine aggregates such as, for example, sand), and cements (containing both fine aggregates and coarse aggregates, such as gravel, pebbles, and crushed stone, which aggregates are selected, for example, from those classified according to the European standard EN 12620).

The present invention is aimed in particular at mortars and cements.

By mineral additive is meant any type of finally subdivided inorganic material that can be added to the cements to impart improved characteristics of mechanical resistance and durability. The additives may be inert, pozzolanic, or having latent hydraulic activity (these additives are, for example, selected from those admitted by the European standard EN 206-1).

For example, a subject of the invention is a cement conforming to the European standard EN 206-1 having an additive content greater than 10 kg/m³.

Therefore the additive that is a subject of the invention is a finely subdivided and particularly active ground glass. A cementitious composition according to the present invention may comprise further additives having latent hydraulic or pozzolanic activity such as, for example, fly ash, microsilica, or finely ground, granulated blast-furnace slag.

The glass additive according to the present invention, when subjected to activation, is transformed into a different material, known as activated additive. According to the present invention, activation is used to mean a process comprising series of washing with water and subsequent separation by settling and/or filtration and/or drying.

said washing with water is preferably carried out by the stages of:
  suspending the ground glass in water
  separating the glass by settling and filtration
  at least one further suspension of the glass in water followed by separation and filtration of the glass
  oven drying of the glass so washed.

More preferably, said washing with water is carried out by the stages of:
  suspending the ground glass in water in a concentration of 100 g/liter and stirring for 24 hours
  separating the glass by settling and filtration
  performing two further washings in water according to the same suspending, settling and filtration procedure
  oven drying at 105° C. of the glass so washed.

Characteristics and advantages of the present invention are described in greater detail in the following examples, which are given solely for illustrative purposes non-limiting of the present invention.

DETAILED DESCRIPTION OF THE INVENTION

EXAMPLES

In the examples described, activated ground glass according to the present invention has been used for the preparation of mixtures in mortar and cement by using directly in the mixer.

Evaluation of the performances of the cement in relation to the AAR behaviour has been performed by testing both in mortar and in cement.

For the purpose of demonstrating the efficacy of the invention, aggregate containing reactive silica and therefore susceptible to AAR has been used; the content of reactive species in the various factions of aggregates was measured as on average 23% of the total aggregate content.

Into the mixtures of mortar and cement, the source of alkali was introduced in the form of NaOH dissolved in the mixing water in the quantity of 1% by weight, expressed as $Na_2O$ referred to the binder.

Mortar test pieces of dimensions 4 cm×4 cm×16 cm and cement test pieces of dimensions 80 mm×80 mm×280 mm were manufactured.

Performance was determined by measuring the expansion of the test pieces, it being desirable according to the purposes of the invention to obtain the lowest possible expansion values.

In the case of testing in mortar, the test pieces were exposed in a 1N solution of NaOH at 80° C., having been turned out of the mould after 24 hours. These conditions should therefore be considered particularly severe both due to the elevated temperature and because of the continuous supply of alkali during the exposure.

In the case of test pieces made of cement, the following conditions of exposure were used having turned out the test pieces from the mould after 24 hours:

20° C. and 95% RH
38° C. and 100% RH

Chemical characterisations of the glass would also performed by fluorescence and SEM microanalysis.

Example 1

Three cements of rheological class S3 were manufactured with CEM II/A-LL 42.5R, which cements had the following proportions in mixture:

water/binder ratio equal to 0.44
binder content equal to 420 kg/m³
comprising NaOH in a quantity equal to 1% of binder expressed as $Na_2O$ and containing respectively in a proportion by weight of 20% of binder:
  activated pulverised glass (APG) according to the present invention
  non-activated pulverised glass (preAPG), used as a reference material, outside the scope of the present invention, having an activation parameter A as defined above below 1.9.

Also given, as reference material no. 1, is a cement manufactured without addition of glass, wherein the weight corresponding to the missing additive is made up with cement.

The chemical compositions of both glasses are presented in Table 1. The BET characterisations and the laser granulometry results are shown in Table 2.

As shown in Table 3, in the case of maturation at 38° C. and 100% RH and in Table 4, in the case of maturation at 20° C. and 95% RH, the use of activated pulverised glass has led to a reduction in the deformation (expansion) of the test pieces relative to that demonstrated by the reference cements, in particular relative to reference material No. 1.

This expansion reduction is to be considered as demonstrated by the technical effect of the invention.

The activated pulverised glass was obtained from pulverised glass in the following way:

suspending the pre-APG pulverised glass in water in a concentration of 100 g/liter and stirring for 24 hours
separating the phase by natural settling/filtration
performing two further washings according to the same procedure
oven drying at 105° C. of the residue obtained.

TABLE 1

|  | preAPG—pulverised glass (reference 1) | APG—activated pulverised glass (present invention) |
|---|---|---|
| Reactive $SiO_2$ [%] | 52.88 | 54.93 |
| $SiO_2$ [%] | 69.0 | 69.1 |
| $Al_2O_3$ [%] | 2.70 | 2.62 |
| $Fe_2O_3$ [%] | 0.36 | 0.36 |
| CaO [%] | 8.84 | 8.86 |
| MgO [%] | 1.44 | 1.59 |
| $Na_2O$ [%] | 15.6 | 15.3 |
| $K_2O$ [%] | 0.84 | 0.82 |

TABLE 2

|  |  | preAPG—pulverised glass (reference 1) | APG—Activated pulverised glass (present invention) |
|---|---|---|---|
| $SS_{BET}$ | m²/g | 0.59 | 1.07 |
| $A = SS_{BET}/Sv \cdot \rho$ | — | 1.5 | 3.0 |
| Density - $\rho$ | g/cm³ | 2.540 | 2.544 |
| Laser - Sv (specific surface) | m²/cm³ | 0.99 | 0.92 |
| Laser -xp (mean diameter) | μm | 16.7 | 17.3 |
| Laser - n (amplitude) | — | 1.23 | 1.28 |

TABLE 3

|  | Maturation at 38° C. and 100% RH | | | |
|---|---|---|---|---|
| Deformation (expansion) [μm/m] | 18 weeks | 26 weeks | 39 weeks | 52 weeks |
| Reference no 1 (no additive) | 2411 | 2413 | 2477 | 2564 |
| Reference no 2 (preAPG—Pulverised glass) | 836 | 911 | 1013 | 1255 |
| APG—Activated pulverised glass (present invention) | 282 | 471 | 636 | 786 |

TABLE 4

|  | Maturation at 20° C. and 95% RH | | | |
|---|---|---|---|---|
| Deformation (expansion) [μm/m] | 18 weeks | 26 weeks | 39 weeks | 52 weeks |
| Reference no 1 (no additive) | 1914 | 1882 | 1939 | 2018 |
| Reference no 2 (preAPG—Pulverised glass) | 554 | 611 | 739 | 914 |

TABLE 4-continued

| Deformation (expansion) [μm/m] | Maturation at 20° C. and 95% RH | | | |
|---|---|---|---|---|
| | 18 weeks | 26 weeks | 39 weeks | 52 weeks |
| APG—Activated pulverised glass (present invention) | 43 | 82 | 89 | 179 |

Example 2

Four mixtures were prepared in mortar containing CEM II/A-LL 42.5R and having the following proportions in mixture:

water/binder ratio=0.51 aggregate/binder ratio=2.25 and containing NaOH in a quantity equal to 1% of binder expressed as $Na_2O$ and containing two different activated pulverised glasses according to the present invention (V1 and V2), in a proportion by weight of 20% of binder.

Also given as a reference material is a mixture wherein the weight corresponding to the missing additive is made up with cement.

The chemical compositions of the glass are presented in Table 5 and the results of the granulometric and laser analyses are presented in Table 6, together with the respective analyses of the pulverised glass prior to activation (pre-V1 and pre-V2 respectively), which are outside the scope of the present invention, having an activation parameter A below 1.9.

Table 7 shows the deformations (expansions) measured for the various manufactured mixtures. Also mentioned therein as a reference is the APG glass already described in example 1.

Table 7 also reveals that the glass of the present invention results in reduced expansion as compared with the reference.

The activated pulverised glass was obtained in the following way:

suspending the pulverised glass in water in a concentration of 100 g/liter and stirring for 24 hours separating the phase by natural settling/filtration performing two further washings in water according to the same procedure oven drying at 105° C. of the residue obtained.

TABLE 5

| | preV1 (outside the scope of the present invention) | preV2 (outside the scope of the present invention) | V1 (present invention) | V2 (present invention) |
|---|---|---|---|---|
| Reactive $SiO_2$ [%] | 34.93 | 43.43 | 38.98 | 45.59 |
| $SiO_2$ [%] | 69.5 | 69.2 | 69.3 | 69.4 |
| $Al_2O_3$ [%] | 2.51 | 2.58 | 2.39 | 2.54 |
| $Fe_2O_3$ [%] | 0.33 | 0.34 | 0.34 | 0.34 |
| CaO [%] | 8.63 | 8.64 | 8.69 | 8.73 |
| MgO [%] | 1.42 | 1.44 | 1.55 | 1.58 |
| $Na_2O$ [%] | 15.7 | 15.7 | 15.5 | 15.2 |
| $K_2O$ [%] | 0.86 | 0.85 | 0.85 | 0.85 |

TABLE 6

| | | preV1 (outside the scope of the present invention) | preV2 (outside the scope of the present invention) | V1 (present invention) | V2 (present invention) |
|---|---|---|---|---|---|
| $SS_{BET}$ | m2/g | 0.370 | 0.384 | 0.434 | 0.739 |
| $A = SS_{BET}/Sv \cdot \rho$ | — | 1.8 | 1.5 | 2.0 | 2.8 |
| Density - $\rho$ | g/cm³ | 2.541 | 2.542 | 2.546 | 2.544 |
| Laser - Sv (specific surface) | m₂/cm₃ | 0.51 | 0.65 | 0.56 | 0.67 |
| Laser -xp (mean diameter) | μm | 47.74 | 30.09 | 38.17 | 28.48 |
| Laser - n (amplitude) | — | 1.06 | 1.16 | 1.15 | 1.2 |

TABLE 7

| Deformation (expansion) | Maturation in NaOH 1N at 80° C. | | |
|---|---|---|---|
| [μm/m] | 7 days | 14 days | 28 days |
| Reference | 2919 | 4784 | 8081 |
| V1 (present invention) | 2213 | 3225 | 4419 |
| V2 (present invention) | 1888 | 2481 | 4594 |

Example 3

Figure 1:
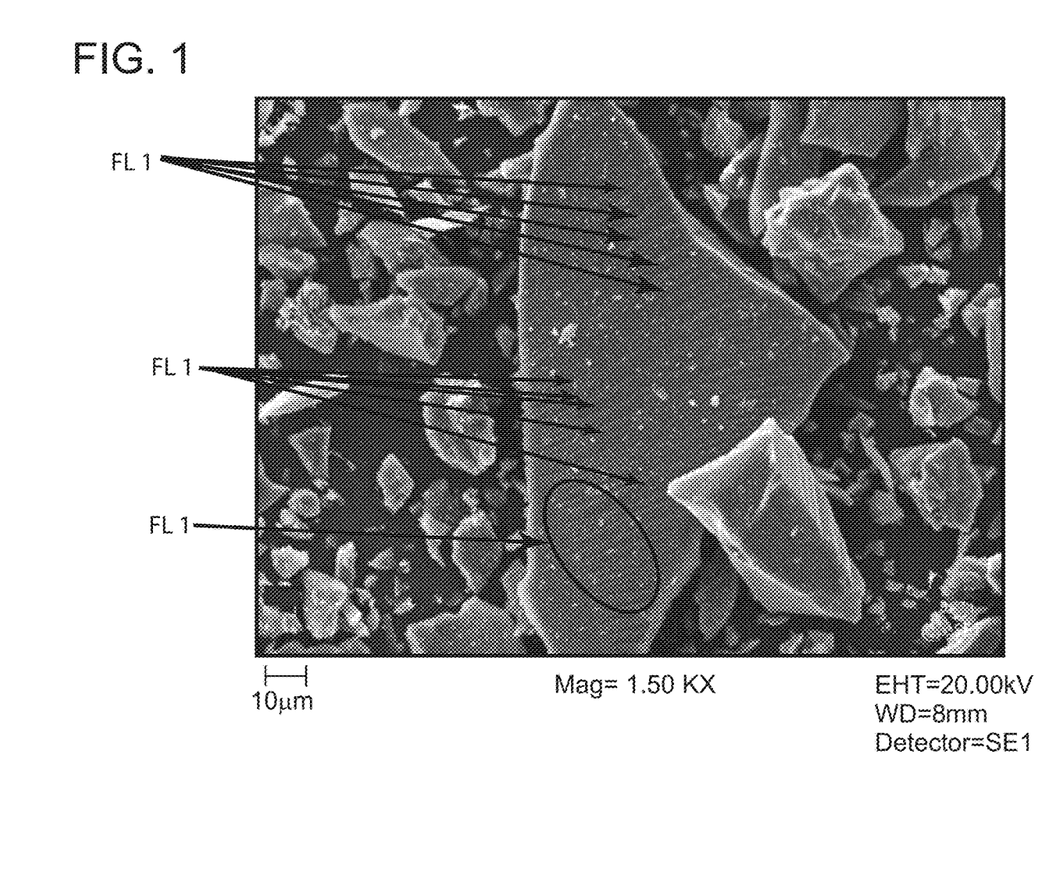
FIGS. 1 to 4 attached hereto show electron micrographs of the samples of glass described in Example 3 below.

From the qualitative point of view, an activated pulverised glass according to the present invention has a surface texture different from that of a non-activated pulverised glass. The non-activated pulverised glass being obtained by crushing processes, the fracture surfaces of the non-activated particles show fracture lines FL1 derived from the crushing process that can be demonstrated using an electron microscope, as shown in FIG. 1.

Figure 2:
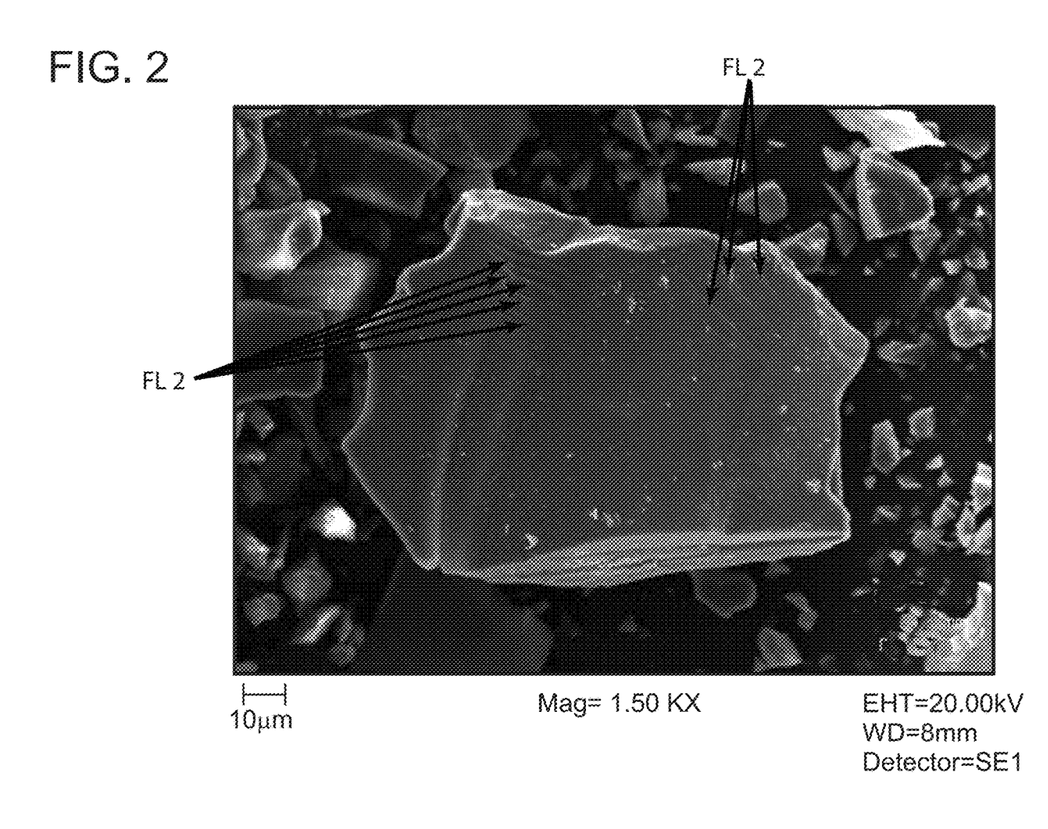

As shown in FIG. 2, following the activation process, the facture lines FL2 present on the surfaces of the activated particles of pulverised glass are less evident or even non-demonstrable.

More particularly, the activated pulverised glass FIG. 2 was obtained from the pulverised glass of FIG. 1 in the following way:

suspending the pulverised glass in water in a concentration of 100 g/liter and stirring for 24 hours separating the phase by natural settling/filtration performing two further washings in water according to the same procedure oven drying at 105° C. of the residue obtained.

Figure 3:
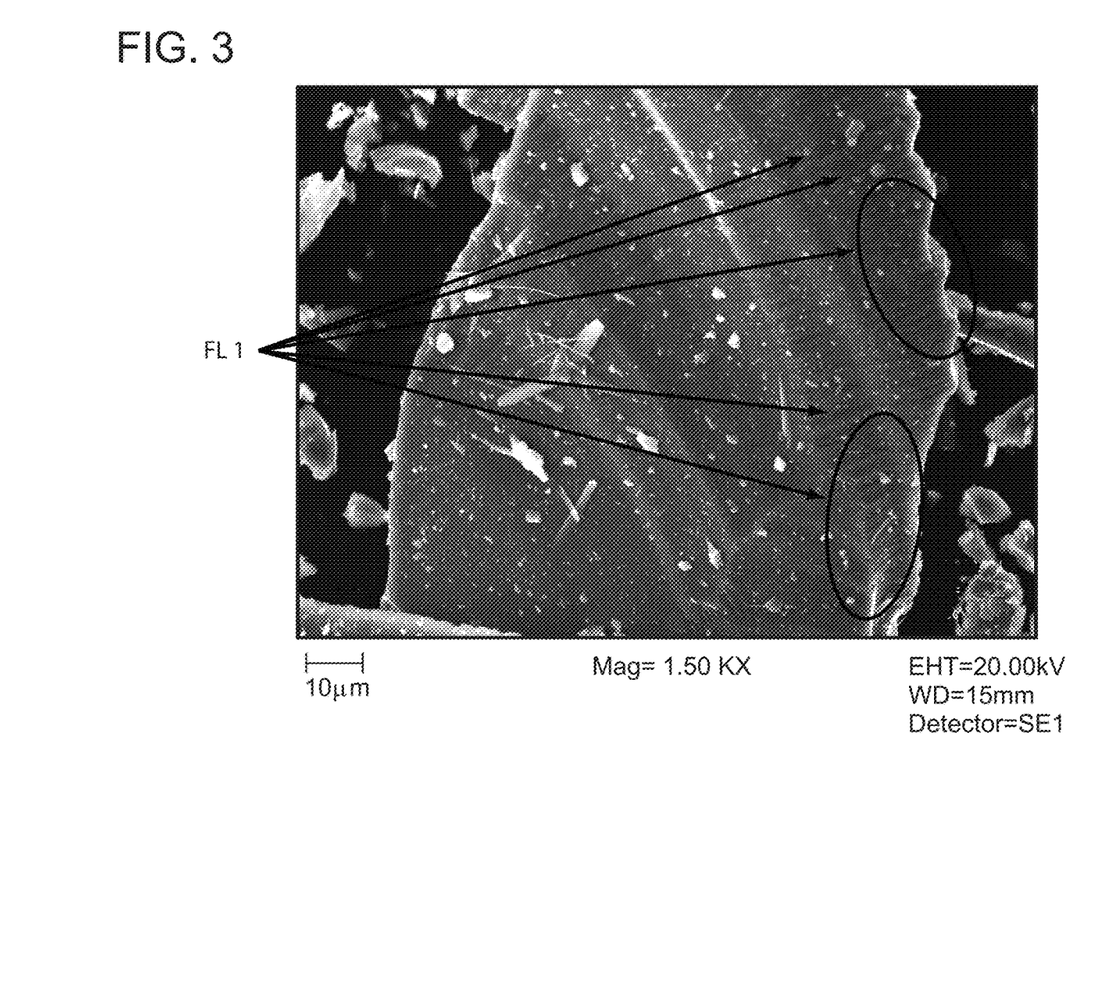

Another example of non-activated pulverised glass is presented in FIG. 3. The non-activated pulverised glass being obtained by crushing processes, the fracture surfaces of the non-activated particles show fracture lines FL1 derived from the crushing process that can be demonstrated using an electron microscope.

Figure 4:
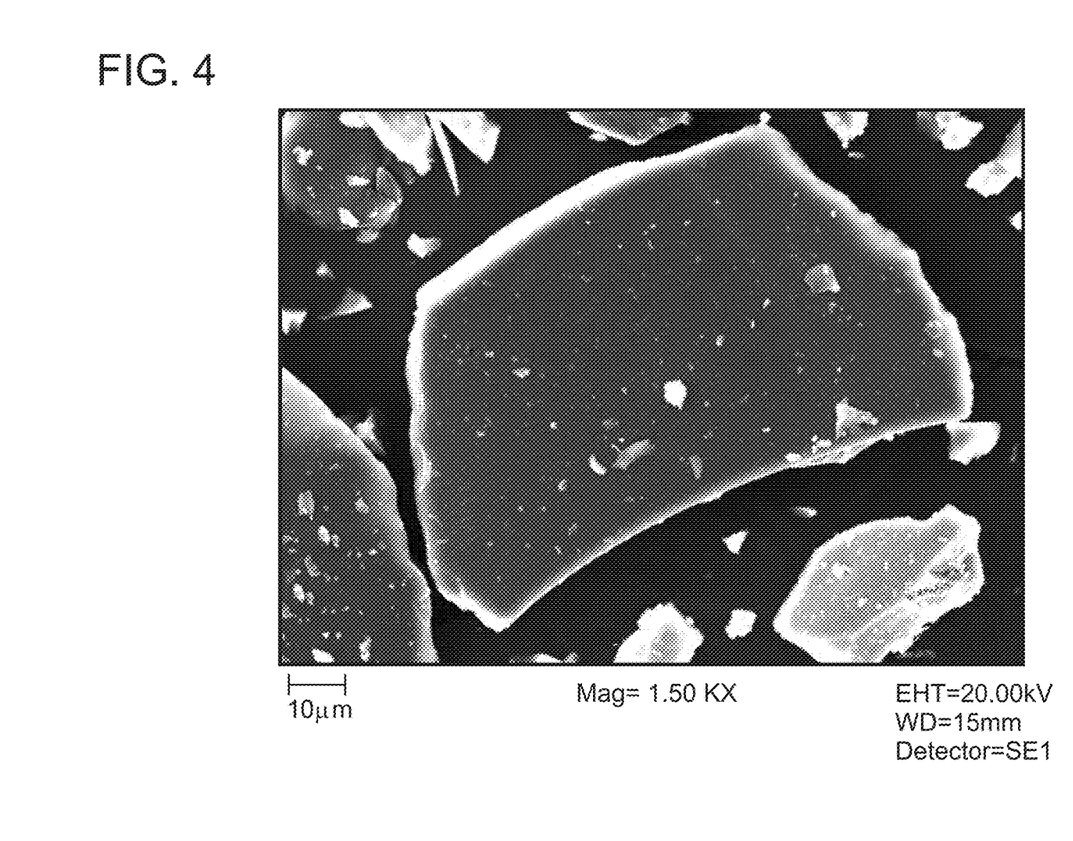

A corresponding case of activated pulverised glass is presented in FIG. 4. As shown in FIG. 4, following the activation process, the fracture lines FL2 present on the surfaces of the activated particles of pulverised glass are less evident or even non-demonstrable. In general terms, according to the present invention it is surprising that a treatment of the pulverised glass by a series of washings with water can increase its capacity to mitigate the AAR.

This technical effect is all more surprising considering the merely marginal impact of the washing operations on the chemical composition of the glass, more particularly on the proportion of silica and on the content of alkali.

It is therefore possible to use the technical solution proposed in the present invention, for example, to reduce the costs associated with the process of compression comminution, which would make it necessary to obtain a non-activated glass having comparable performances, when such a pulverised glass is not already available as a byproduct of an industrial process.

Furthermore, the release of alkali into water by finely subdivided glass can be very rapid and can lead to a rapid saturation of the solution in contact, and for this reason renewal is necessary to achieve the desired degree of activation of the glass. Such alkaline aqueous solutions have a potential use in the construction materials sector as activators of ground blast-furnace slag, even if the latter is used as an additive to cement in accordance with the harmonised European standard EN 15167.

Alkaline aqueous solutions could also be used in the construction materials sector for markedly reducing $CO_2$ associated with the production of clinker associata alla produzione del clinker, even if the following reactions are made the basis of the process of eliminating installation fumes:

$$Na_2O_{(aq)} + CO_{2(g)} \rightarrow Na_2CO_{3(s)}$$

The invention claimed is:

1. A cementitious composition suitable to form mortars or concretes including at least one hydraulic binder, water, optionally one or more aggregates, and comprising activated glass particles as an addition to mitigate an alkali-aggregate reaction, wherein a mitigation effect of the alkali-aggregate reaction is improved by activated glass particles obtained by firstly grinding to pulverization with an average diameter ranging from 10 and 200 micron, and an activation step consists of a subsequent washing of the grinded glass particles with fresh water that is renewed before it is saturated by the release of alkali into water by the finely subdivided glass, wherein the glass particles after grinding and washing with water have a ratio A between the specific surface $SS_{BET}$, expressed in $m^2/g$, and the laser specific surface Sv, expressed in $m^2/cm^3$, by the density, r, expressed in $g/cm^3$, defined as activation parameter $A = SS_{BET}[m^2/g] / Sv[m^2/cm^3] \cdot \rho[g/cm^3]$, in a range from 1.9 to 4.0.

2. The cementitious composition as claimed in claim 1 wherein the grinded glass particles undergo washing with water carried out by a series of subsequent washings.

3. The cementitious composition as claimed in claim 1 wherein said activation parameter A ranges from 2.0 to 3.0.

4. The cementitious composition as claimed in claim 1 wherein said washing with water is carried out through the steps of:
   suspending in water the grinded glass particles
   separating the glass particles by settling and filtration
   submitting the glass particles to at least a further suspension in water followed by separation and filtration of the glass particles
   oven drying of the glass particles so washed.

5. The cementitious composition as claimed in claim 4 wherein said washing with water is carried out by the steps of:
   suspending in water the grinded glass particles in a concentration of 100 g/ liter and stirring for 24 hours
   separation of the glass particles by settling and filtration
   performing two further washings in water according to the same suspending, settling and filtration procedure
   oven drying at 105 ° C. of the glass particles so washed.

6. The cementitious composition as claimed in claim 1 including at least a hydraulic binder, water and optionally one or more aggregates, and/or one or more mineral additions, and/or fibres for cements, and/or one or more additives, wherein said glass particles as an addition have an amount by weight equal to 20% of said hydraulic binder.

* * * * *